United States Patent [19]

Hyler et al.

[11] 4,053,170
[45] Oct. 11, 1977

[54] PANHARD SPRING SUSPENSION ARRANGEMENT FOR OFF-ROAD VEHICLES

[75] Inventors: John H. Hyler; Edward G. Orth, both of Peoria, Ill.

[73] Assignee: Westinghouse Air Brake Company, Pittsburgh, Pa.

[21] Appl. No.: 681,465

[22] Filed: Apr. 29, 1976

[51] Int. Cl.² .............................................. B60G 21/00
[52] U.S. Cl. ............................................. 280/112 R
[58] Field of Search .................. 280/709, 111, 112 R, 280/112 A; 180/52

[56] References Cited

U.S. PATENT DOCUMENTS

| 2,805,079 | 9/1957 | Vostrez | 280/111 |
| 3,174,770 | 3/1965 | Drechsel | 280/112 R |

Primary Examiner—Philip Goodman
Attorney, Agent, or Firm—Leydig, Voit, Osann, Mayer & Holt, Ltd.

[57] ABSTRACT

A heavy duty suspension for an off-road vehicle including an axle assembly formed of a transversely extending axle housing and a forwardly extending tongue rigid with the axle housing, the axle assembly having front and rear pivot connections defining a fore-and-aft extending roll axis. A rigid bracket extends downwardly from the chassis to a point substantially offset in the lateral direction from the roll axis. Connected to the bracket is a horizontal link, one end of the link being pivoted to the lower end of the bracket and the other end of the link being pivoted to the axle housing so that the link restrains the axle assembly from moving laterally with respect to the chassis while accommodating rolling and vertical movement as the vehicle passes over irregular ground. A single damped spring suspension device is vertically arranged adjacent the axle, the suspension device being connected at its upper end to the chassis and supportively coupled at its lower end to the axle assembly at the roll axis so that the supportive effect of the suspension device is distributed evenly to both of the wheels. In one embodiment the horizontal link is in the form of a centrally pivoted lever, permitting the suspension device to be substantially spaced from the chassis center line. An auxiliary damping biasing spring of the centering type is provided for relatively biasing the axle assembly toward a position parallel to the chassis.

10 Claims, 9 Drawing Figures

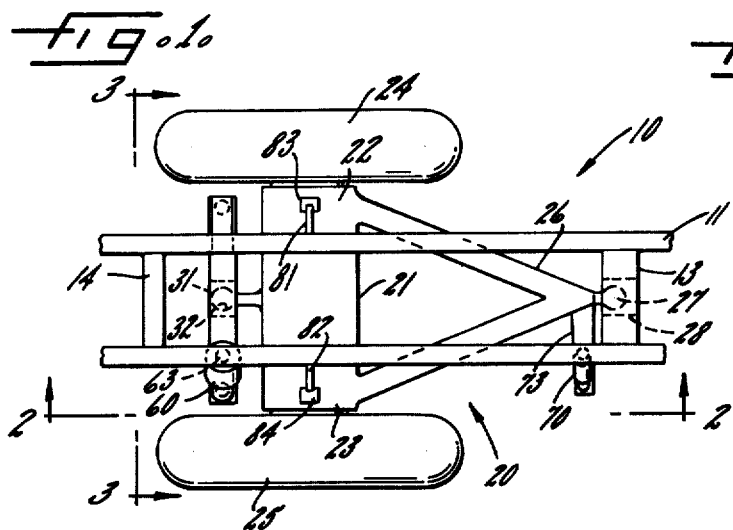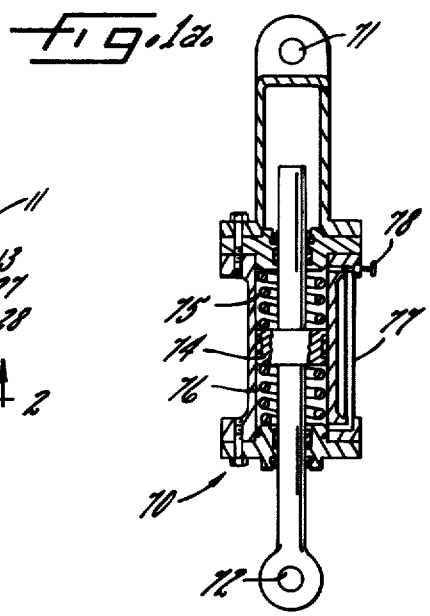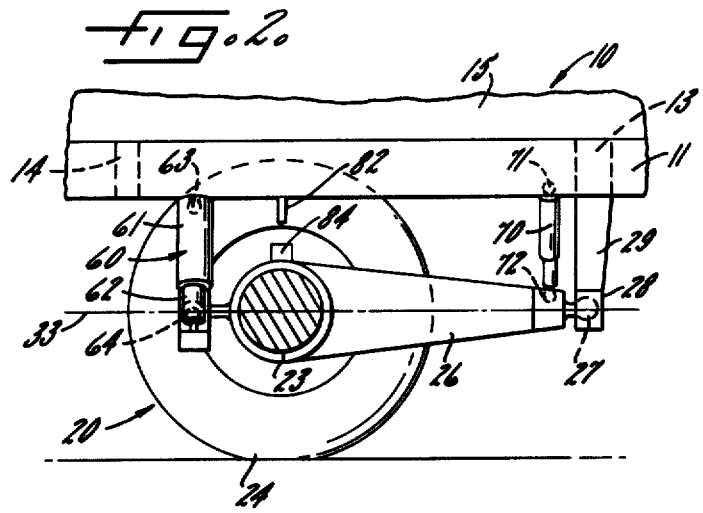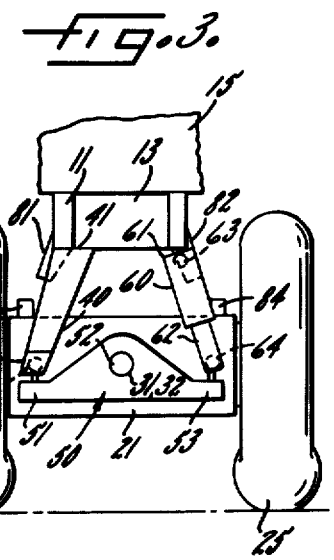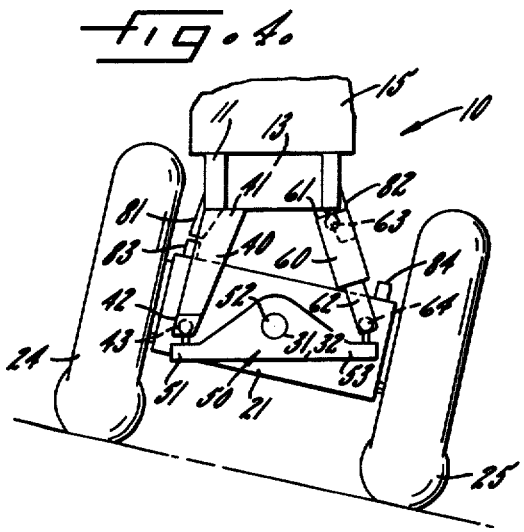

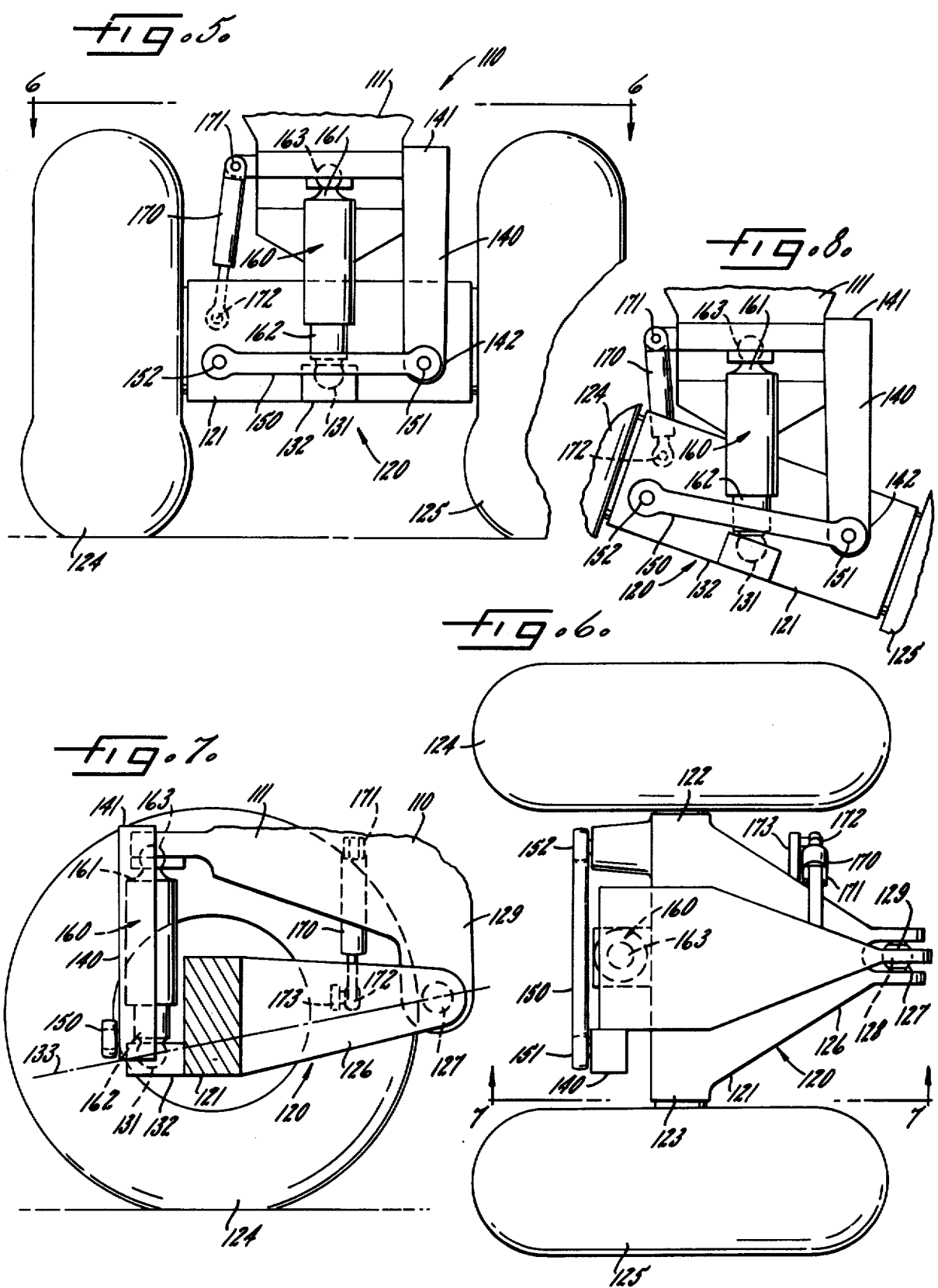

PANHARD SPRING SUSPENSION ARRANGEMENT FOR OFF-ROAD VEHICLES

BACKGROUND OF THE INVENTION

The present invention relates generally to spring suspensions for off-road vehicles such as earthmoving machines.

In the past it has been the practice to simply dispense with springing of the chassis in an off-road vehicle such as an earthmoving scraper. This has resulted in a rough ride for the operator and the transmission of destructive shocks to the vehicle when negotiating rough ground. In those instances where springing has been employed, particularly for earthmoving vehicles of light construction, the tendency has been to utilize the principles of suspension which have been used in automobiles and highway trucks, that is, each wheel has been provided with individual springing and damping means. The individual springing has meant that irregularities in ground contour causing momentary tilting to right or left must be accommodated by opposite movements in the right and left suspension means. This causes constant and unnecessary exercising in the suspensions on rough terrain with generation of high suspesnion forces resulting in aggravated wear and high maintenance cost. Moreover, where the wheels are separately sprung with the desired softness or compliance there is a sacrifice in roll stability, that is, there is lowered resistance to sway or roll between suspensions at one axle location. As a result, where separate springing is used, it is often necessary to compromise springing, roll stability, or both in order to achieve a practical solution.

Some efforts have been made in the past to depart from individual wheel springing as practiced, for example, in an off-road truck of early Dart manufacture. In such structure a single horizontal pinned joint was provided between the axle housing and the lower end of the suspension to permit oscillation of the axle housing in a plane transverse to the center line of the vehicle. Such an arrangement, however, subjected the suspension device to rather large side forces and resulted in a coupling of motion in both the transverse and longitudinal directions, in addition to the vertical loads required of the suspension. Such side forces and couples are aggravated further by use of oscillation limit stops requiring the suspension to support the entire axle load at a wheel at one end of the axle. A suspension of adequate capability constructed on this order utilizes space down the chassis center line which is often needed for components such as engine and power train. In addition to interfering with critical components in some vehicle arrangements, the suspension is of inherently increased size and cost. Moreover, no "roll stability" is provided about the longitudinal oscillation axis.

Finally, in the so-called "cushion hitch" used in certain Caterpillar earthmoving vehicles the axle is rigidly attached to the frame or chassis which is connected to the tractor by a joint which permits relative rolling movement about a longitudinal oscillation axis. The only cushioning against bumps and irregularities is that which occurs in the tires and the only springing is that which is provided between the two main portions of the vehicle i.e., between the front or tractor section and the rest of the vehicle. Moreover, there is no control of "roll stability" about the longitudinal oscillation axis.

SUMMARY OF THE INVENTION

It is, accordingly, an object of the invention to provide a suspension for a heavy off-road vehicle which overcomes the disadvantages of separately sprung wheels as well as the disadvantages of prior unitary springing arrangements. Variations in the lateral slope of the ground, transversely of the vehicle, may be accommodated without exercising the suspension device which substantially reduces wear and necessity for maintenance. The suspension device may function in a preferred state for a given load condition, therefore with greater isolation effectiveness. The suspension device is reserved for accommodating vertical acceleration. Thus tire loads may be equalized and structural stresses reduced.

It is a further object of the invention to provide a suspension arrangement which is highly economical, with two suspension devices being replaced by one and with a halving of the number of attachment and wear points resulting in a high degree of simplicity and ease of maintenance.

It is a further object of the invention to provide a suspension for an off-road vehicle in which the degree of "roll stability" may be engineered entirely independently of the stiffness of wheel springing so that both factors may be independently optimized. That is to say, the suspension may be designed for optimum springing conditions and the "roll stability" may be varied all the way from zero to whatever level may be optimum for a given vehicle application. This is in contrast to the compromises between wheel springing and roll stability which is required where the vehicle wheels are separately sprung.

It is still another object of the invention to provide a suspension for an off-road vehicle which employs a unitary spring suspension device and in which the degree of springing may be readily changed, depending upon the use of the vehicle and the characteristics required, without making any structural change and by the simple expedient of shifting pivot points to vary the degree of mechanical advantage in the system. This makes it possible to employ standardized suspension devices and structures for an entire range of vehicles and also provides means to accommodate different axle housing proportions while maintaining near optimum suspension system characteristics. "Roll stability" may be similarly adjustable over a wide range by changing of pivot point locations for a centering type damped spring without necessity for going to a unit having a spring of larger or smaller size.

It is a still further object to provide a suspension for an off-road vehicle in which large side loads and couples are not imposed upon the suspension device, thereby reducing the size and cost of suspension components. In addition the system is economical of space by its location in an out-of-the-way position under the chassis and generally below the top of the axle housing, permitting maximum use of space for the tractor engine and power train components the length of the chassis, while keeping the chassis as low as possible.

The above features and advantages are achieved by using a rigid bracket which extends downwardly from the chassis to a point substantially offset in the lateral direction from the roll axis of the axle assembly together with a horizontal link having a first pivot point secured to the lower end of the bracket and a second pivot point, laterally spaced therefrom, pivoted to the axle housing. Thus the axle assembly is restrained by the link for moving laterally with respect to the chassis while accommodating rolling movement of the axle assembly about the roll axis as the vehicle passes over irregular ground contours. A single damped spring suspension device, vertically arranged adjacent the axle, is connected at its upper end to the chassis and supportingly coupled at its lower end to the axle assembly at the roll axis so that the supportive effect of the suspension device is distributed evenly to both of the wheels. In the first embodiment of the invention the horizontal link is in the form of a lever centrally pivoted to the axle housing and pinned to the chassis bracket at one of its ends and to the lower end of the suspension device at the other, with the portion of the lever which extends beyond the central pivot point serving to couple the suspension device so that its effect is applied at the roll axis.

In a second disclosed embodiment of the invention a simple panhard type lever is used to couple the bracket to a pivot point, laterally spaced therefrom, on the axle housing, with the suspension device being interposed between the chassis and the axle housing along the roll axis, again insuring that the supportive effect of the suspension is distributed evenly to both of the wheels.

DESCRIPTION OF THE DRAWINGS

FIG. 1 is a fragmentary plan view of an axle assembly and portion of chassis embodying a suspension constructed in accordance with the invention.

FIG. 1a shows, in cross section, a damped, self-centering suspension device.

FIG. 2 is a side elevational view looking along the line 2—2 in FIG. 1.

FIG. 3 is a rear elevational view looking along the line 3—3 in FIG. 1 under level ground conditions.

FIG. 4 is a view similar to FIG. 3 but showing accommodation to a lateral tilt but with zero deflection of the suspension device.

FIG. 5 is a rear elevational view of a modified structure embodying the invention.

FIG. 6 is a top view looking along line 6—6 in FIG. 5.

FIG. 7 is a vertical cross section, transversely of the axle housing, looking along line 7—7 in FIG. 6.

FIG. 8 is a fragmentary elevation similar to FIG. 5 but showing lateral tilt.

While the invention has been described in connection with two preferred embodiments, it will be understood that I do not intend to be limited to the particular embodiments shown but intend, on the contrary, to cover the various alternative and equivalent constructions included within the spirit and scope of the appended claims.

Referring now to FIGS. 1-3 there is shown only a portion of an off-road earthmoving vehicle, the remainder of the vehicle being omitted for the sake of simplification. The vehicle includes a chassis 10 here in the form of a pair of longitudinal members 11, 12 with typical cross members 13, 14 supporting a superstructure 15.

In carrying out the invention an axle assembly 20 is provided in a position below the chassis, the axle assembly including an axle housing 21 having lateral ends 22, 23 mounting vehicle wheels 24, 25. Projecting forwardly from the axle housing in centered position, and rigid therewith in at least the lateral direction, is a tongue 26. The tongue carries a ball 27 at its forward end secured in a socket 28, the latter being mounted on a bracket 29 depending from the chassis. The ball and socket connection provides captivity for tractive effort while permitting vertical articulation and relative "rolling" movement of the axle assembly as the vehicle negotiates rough terrain.

Mounted at the rear of the axle assembly, and generally centered thereon, is a second ball and socket connection consisting of a ball 31 and socket 32, the two ball and socket connections, as will appear, defining a fore-and-aft extending roll axis 33.

In accordance with the present invention a rigid bracket is provided extending downwardly from the chassis to a point adjacent to the axle housing and substantially offset in the lateral direction from the roll axis, the lower end of the bracket being connected to a horizontal link having at least first and second transversely spaced pivot points, the second pivot point being pinned to the axle housing. Referring particularly to FIG. 3 the rigid downwardly extending bracket 40 has an upper end 41 which is welded or otherwise secured to the chassis and a lower end 42 providing a ball and socket connection 43. Alined with the latter is a horizontal transversely extending link 50 in the form of a lever having a first end 51, making a "first" pivot connection at 43. The "second" pivot connection 52 is formed by connecting the central portion of the lever to the socket 32 mounted on the ball 31 at the rear of the axle housing. The member 50 is extended to form a right-hand end 53 to which reference will be made.

Further in accordance with the invention a single damped spring suspension device is vertically arranged adjacent the axle housing, the suspension device being connected at its upper end to the chassis and supportingly coupled at its lower end to the axle assembly at the roll axis. In the present instance the damped spring suspension device, indicated at 60, has upper and lower ends 61, 62. The upper end is coupled to the chassis at a ball and socket joint 63 while the lower end is connected, via a ball and socket joint 64 to the right-hand end 53 of the lever. The right-hand end of the lever thus serves to transmit the reaction force of the suspension device 60 to the center of the rear axle housing so that the supportive effect of the suspension device is distributed evenly to both of the wheels. At the same time the link which is formed by the left-hand end 51 of the lever, which is transversely extending, serves to restrain the axle assembly from moving laterally with respect to the chassis while nevertheless accommodating rolling movement of the axle assembly about the roll axis as the vehicle passes over irregular ground contours. In the present instance the left and right-hand arms of the lever are of equal length, but it will be understood that this is not a necessary condition of the invention and, indeed, the connection 64 may be moved inwardly or outwardly on the lever to change effective mechanical advantage and hence the suspension characteristics.

Further in accordance with the invention a biasing spring of the centering type, and preferably damped, is connected between the chassis and the axle assembly at a point which is eccentric to the roll axis for centeringly biasing the axle assembly parallel to one another. In a practical case the biasing spring may be in the form of an auxiliary suspension devie 70 having a first pivotal connection 71 with a chassis and a second pivotal connection 72, at its lower end, to a laterally extending arm 73 which is rigidly secured to the forward end of the tongue 26, the pivotal connections 71, 72 being preferably in the form of ball and socket connections, as shown.

The suspension device 60 is of the type having a spring acting in parallel to an hydraulic damping cylinder, with orifice size for the hydraulic fluid as required to obtain optimum suspension damping. Preferably, the suspension device 60 is of the heavy-duty "air over oil" type, for example, of the type known as the Hydrair II truck suspension, in which a captive body of gas, under pressure, serves as the resilient medium, with provision for adjusting oil and gas volumes and gas pressure to establish the desired spring rate characteristics for a given chassis application.

The auxiliary suspension device 70 (FIG. 1a) is of the self-centering type well known in the automotive field incorporating a central hydraulic piston 74 having opposed springs 75, 76 for biasing to an intermediate position. The spring rates and forces are selected to provide the desired degree of roll stability in accordance with the intended usage. Damping is provided by an hydraulic bypass 77 between opposite ends of the hydraulic cylinder, under control of a needle valve 78 to permit optimizing of roll damping. The device 70, befitting its usage in a piece of heavy off-road equipment, is preferably of larger and more durable construction than the customary automotive units.

It is one of the further features of the invention that means are provided for limiting the relative rocking movement of the chassis and axle assembly about the roll axis. For this purpose brackets 81, 82 may be rigidly secured to the chassis with limit stop pads 83, 84, preferably of resilient construction on the axle in receiving position.

The position of the elements with the device proceeding along level ground is illustrated in FIG. 3. Under such conditions, with the correct amount of gas pressure in the suspension device 60, the chassis and axle assembly are both horizontal, and parallel, so that the auxiliary centering spring device 70 is in its neutral condition. Under such circumstances the suspension device 60, in its steady state condition, is in readiness to cushion the chassis against any bump which may be encountered by either or both of the vehicle tires. Assume, for example, that both tires simultaneously encounter an abrupt transverse ridge. This results in sudden upward movement of the axle housing about its forward point of attachment. Because of the inertia of the chassis 15 and its contained load, there is a sharp reaction force which is applied vertically downwardly at the upper ends of both the bracket 40 and suspension device 60. This causes the suspension device 60 to resiliently yield so that the axle assembly is free to yield upwardly, accompanied by limited counterclockwise rocking of the lever 50, so that the bump is negotiated with the chassis maintained at a relatively stationary level. Once the bump has been surmounted, and its vertical accelerational effect dissipated, the suspension device 60 is free to restore itself to its normal running position which in turn restores the lever 50 to the illustrated horizontal position.

In the event that either of the wheels should strike an obstruction such as a rock or small boulder individually, the effect is the same: When the engaged wheel is accelerated upwardly tending to raise the level of the ball 31 at the rear pivot connection, the chassis develops a reaction force temporarily compressing the suspension device 60, that is to say causing it to yield, until the bump has been safely passed and effectively cushioning the movement of the chassis. Since the suspension device 60 is effectively supported, at its lower end, at the center of the rear axle housing, that is, at the roll axis 33, the suspension device notwithstanding its off center position, cushions bumps equally at each of the wheels. This is true regardless of whether a symmetrical or non-symmetrical lever 50 is employed. The stiffness of the suspension 60 is an inverse function of the length of its lever arm so that upon moving the connection 64 inwardly, effectively shortening the arm 53, a stiffer suspension can be achieved without modification of the suspension device 60. By moving the connection 64 outwardly on the lever, softer cushioning may be achieved. The air pressure in the device 60 may be adjusted to keep the chassis level in accordance with variations in load.

The accommodation of the suspension system when the wheels of the vehicle strike a lateral slope as illustrated in FIG. 4. When considering this figure it is necessary to assume the existence of additional ground engaging members on the vehicle, for example, an additional set of wheels firmly planted on level ground and which tends to keep the chassis and superstructure upright. It will also be assumed, for the moment, that the terrain, while laterally sloping, is smooth so that the cushioning effect of the suspension device 60 is not brought into play. Further it will be assumed that the amount of tilt of the terrain is short of that which will produce engagement of the stops 81, 83. Under such conditions the rigid bracket 40, lever 50 and the suspension device 60 are all non-deflected and bear the same relationship to one another as where the vehicle is traveling on straight level ground. However, the axle assembly following the ground contour, undergoes relative rolling movement about the roll axis 33. This is accompanied by stressing of the spring from neutral in the auxiliary suspension device 70. The device acts in the same manner and equally effectively to accommodate tilting of the ground surface in the opposite direction. If the ground surface, in addition to being tilted, is bumpy, the bumps will be accommodated by superimposed movement within the suspension device 60 as discussed in connection with FIG. 3.

One of the primary advantages of the present system is that the two functions of cushioning ground irregularities and accommodation of rolling movement on sloping ground are divorced from one another. The suspension device 60 acts solely to perform a cushioning function, yielding in the face of bumps both large and small, while being uneffected by rolling action on sloping ground. It is seldom that an off-road vehicle operates on a perfectly horizontal surface; the surface usually has random localized slope in one direction or the other, causing constant rolling action. In conventional types of suspensions, particularly where the wheels are separately sprung, the suspension devices, to accommodate this rolling movement, must be in constant motion, resulting in aggravated wear and need for frequent replacement, with the hydraulic damping means being particularly vulnerable because of its need to absorb the wasted energy.

Not only does the present system extend the useful life of the main suspension device, but since the main suspension device is used exclusively for cushioning, the spring force and rate and the degree of damping may all be adjusted to an optimum condition without any consideration whatsoever of rolling stability.

Conversely, the auxiliary suspension member 70, which responds to rolling movement, may be separately adjusted for spring force and rate, as well as degree of damping, with rolling stability the only consideration to be kept in mind. While it is true that the auxiliary suspension device must operate more or less constantly in off-road terrain, and while it is true that such device must respond where a bump is engaged by only one of the ground engaging wheels at a time, the device 70 is called upon to handle only a small fraction of the energy of the main suspension element and the damping is much less critical, so that the device 70 will also have a useful life greatly exceeding the life of the suspension device in a more conventional system.

While the present system is distinguished by use of a unitary main suspension reacting at the center of the axle housing, nevertheless it should be noted that the suspension device, because of its offside location, leaves the region along the center portion of the axle housing, and between the axle housing and the chassis, completely open (see especially FIGS. 1 and 3) and thus available for installation of drive components or other mechanisms or structural elements.

While the invention has been shown and described in simplified form without any reference to the driving of the ground engaging wheels, it will be understood that the axle assembly may either be non-powered or powered. Where powered, the housing 21 may include the usual axle and differential without in any way departing from the invention. The fact that the main elements 40, 50 and 60 are spaced rearwardly of the axle housing leaves the region ahead of the axle housing free for entry of a longidutinal drive shaft. However, it will be understood that the ball 31 may, if desired, occupy a position at the front of the axle housing, with the suspension elements 40, 50, 60 all shifted to such forward position without departing from the invention.

ALTERNATE EMBODIMENT OF THE INVENTION

The present invention may be practiced employing a somewhat modified construction as set forth in FIGS. 5, 6 and 7. In this modification the suspension system supports a chassis 110 having a rearward extension 111. An axle assembly 120 is provided having an axle housing 121 with lateral ends 122, 123 in which serve to support wheels 124, 125.

Extending forwardly from the axle housing is a rigid tongue 126 engaging a ball 127 having a socket 128, the latter serving to make the front end of the tongue captive with a structural support member 129 connected to the chassis while nevertheless permitting the axle assembly to move vertically as well as to undergo limited roll. At the rear end of the axle assembly is a second ball and socket joint 131, 132 which, with the first such joint, defines a fore-and-aft extending roll axis 133.

For the purpose of coupling the chassis and axle assembly, the chassis is provided with a rigid downwardly extending bracket 140 which is connected at its upper end 141 to the chassis and which has a pivot connection at its lower end 142, the bracket extending to a point adjacent the axle housing but substantially offset in the lateral direction from the roll axis. To prevent lateral shifting movement of the axle assembly with respect to the chassis, a horizontal transversely extending link is provided. Such link, indicated at 150, has a first pivot connection 151 with the lower end of the bracket 140 and a second pivot connection 152 with the axle housing. It will be apparent, as in the preceding embodiment, that such a connection nonetheless permits relative vertical and rolling movement of the axle housing. For the purpose of supporting the chassis and cushioning it against bumps struck by the vehicle wheels, a single damped spring suspension device 160 is vertically arranged adjacent the axle housing, the suspension device being connected at its upper end 161, via a ball and socket connection 163, to the rearward extension 111 of the chassis and at its lower end 162 to the socket 132 at the center of the axle housing and to which previous mention has been made. Thus it will be seen that the main difference between the structure of FIG. 5 and that described earlier is that the vertically arranged unitary suspension device 160, instead of being coupled to the roll axis by a lever arm, is centered over the roll axis and directly coupled to it, permitting the lever 50 to be replaced by a simple link 150 while achieving the same result.

Just as in the case of the earilier embodiment an auxiliary biasing spring, or suspension device, 170 is used which is connected to the chassis at its upper end 171 and which is pivoted to the axle assembly at its lower end 172, on an arm 173, at a point which is eccentric to the roll axis for relatively biasing the axle assembly toward a position parallel to the chassis.

In operation, then, in the event that either one, or both, of the wheels 124, 125 should strike an obstruction, accelerating the axle assembly upwardly, relative movement will take place within the suspension device 60, thereby cushioning the chassis, with such movement being accommodated by swinging movement of the horizontal link 150 to keep the chassis and axle substantially in vertical alinement with one another.

In the event that the wheels strike a localized region of sloping ground level, similar to that illustrated in FIG. 4, the linkage moves accommodatingly as set forth in FIG. 8 without, however, causing any movement within the suspension device 160, the latter remaining unaffected by the continuous relative rolling movement which occurs in off-road usage, just as in the case of the preceding embodiment, thereby enabling the main suspension to be adjusted for optimum cushioning. At the same time, the rolling movement is imparted to, and absorbed by, the auxiliary suspension device 70 which may be adjusted for optimum rolling stability as in the earlier embodiment.

A ball and socket connection of the usual type is preferred for use in the present invention but it will be understood that the term, as used herein, is not limited to the specific construction which has been disclosed but refers generally to a captive type joint with rotational freedom about an axis and with angular freedom in at least one direction perpendicular thereto.

It is a characteristic of both of the embodiments that a major portion of the length of the spring suspension device is accommodated below the top surface of the rear axle housing. This is accomplished in the first embodiment by locating the lever 50 so that it is adjacent the lower portion of the rear axle housing and in the second version by locating a socket 132 which contains the ball 131 at the lower end of the suspension device as low on the axle housing as may be practical. This enables the clearance between the chassis and the axle assembly to be minimized to that required for cushioning purpose thereby to provide a low vehicle center of gravity.

What we claim is:

1. In a heavy duty suspension for an off-road vehicle, the combination comprising a chassis, an axle assembly below the chassis, the axle assembly including a transversely extending axle housing having wheels at the lateral ends thereof and a forwardly extending tongue rigid with the axle housing and generally centered thereon, the forward end of said tongue having a front pivot connection with the chassis, the rear portion of the axle assembly providing a rear pivot connection laterally centered on the axle housing, the front and rear pivot connections being of the ball and socket type defining a fore-and-aft extending roll axis, a rigid bracket extending downwardly from the chassis to a point adjacent the axle housing and substantially offset in the lateral direction from the roll axis, a horizontal transversely extending link having at least first and second spaced pivot points, the first pivot point being pinned to the lower end of the bracket and the second pivot point being pinned to the axle housing so that the axle assembly is restrained by the link from moving laterally with respect to the chassis while accommodating rolling movement of the axle assembly about the roll axis as the vehicle passes over irregular ground contours, and a single damped spring suspension device vertically adjacent the axle housing, the suspension device being connected at its upper end to the chassis and supportingly coupled at its lower end to the axle assembly at the roll axis so that the supportive effect of the suspension device is distributed evenly to both of the wheels, and auxiliary biasing spring means connected between the chassis and the axle assembly at a point eccentric to the roll axis for relatively biasing the axle assembly toward a centered position parallel to the chassis.

2. In a heavy duty suspension for an off-road vehicle, the combination comprising a chassis, an axle assembly below the chassis, the axle assembly including a transversely extending axle housing having wheels at the lateral ends thereof and a forwardly extending tongue rigid with the axle housing and generally centered thereon, the forward end of said tongue having a front pivot connection with the chassis and the rear end of the axle assembly providing a rear pivot connection laterally centered on the axle housing, the front and rear pivot connections being of the ball and socket type defining a fore-and-aft extending roll axis, a rigid bracket extending downwardly from the chassis to a point adjacent the axle housing and substantially offset in the lateral direction from the roll axis, a horizontal transversely extending lever having first and second pivot connections at its respective ends and having a generally central pivot connection, the first pivot connection being pinned to the lower end of the bracket, a single damped spring suspension device vertically arranged adjacent the axle housing, the suspension device being connected at its upper end to the chassis and at its lower end to the second pivot connection on the lever, the central pivot connection on the lever being connected to the rear pivot connection on the axle housing so that the axle assembly is restrained from moving laterally with respect to the chassis while accommodating rolling movement thereof about the roll axis and so that the supporting effect of the suspension device is distributed evenly to both of the wheels.

3. In a heavy duty suspension for an off-road vehicle, the combination comprising a chassis, and axle assembly below the chassis, the axle assembly including a transversely extending axle housing having wheels at the lateral ends thereof and a forwardly extending tongue rigid with the axle housing and generally centered thereon, alined front and back pivot connections on the axle assembly defining a fore-and-aft extending roll axis, the pivot connections being of the ball and socket type with the front pivot connection being connected to the chassis, a horizontal lever extending transversely adjacent the axle housing and pivotally connected in its central region to the rear pivot connection, a rigid bracket secured to the chassis and extending downwardly into pivoted engagement with one end of the lever, and a single damped spring suspension device vertically arranged at the rear of the axle housing, the suspension device being pinned at its upper end to the chassis and at its lower end to the free end of the lever, and means including an auxiliary biasing spring connected between the chassis and the axle assembly at a point eccentric to the roll axis for relatively biasing the axle assembly toward a centered position parallel to the chassis.

4. In a heavy duty suspension for an off-road vehicle, the combination comprising a chassis, an axle assembly below the chassis, the axle assembly including a transversely extending at housing having wheels at the lateral ends thereof and a forwardly extending tongue rigid with the axle housing and generally centered thereon, the forward end of said tongue having a front pivot connection with the chassis, the rear end of the axle assembly providing a rear pivot connection laterally centered on the axle housing, the front and rear pivot connections being of the ball and socket type defining a fore-and-aft extending roll axis, a rigid bracket extending downwardly from the chassis to a point substantially offset in the lateral direction from the roll axis, a horizontal transversely extending link having first and second spaced pivot points, the first pivot point being pinned to the lower end of the bracket, the second pivot point being pinned directly to the axle housing so that the axle assembly is restrained by the link from moving laterally with respect to the chassis while accommodating rolling movement of the axle assembly about the roll axis as the vehicle passes over irregular ground contours, and a single damped spring suspension device vertically arranged adjacent the axle housing, the suspension device being connected at its upper end to the chassis and connected at its lower end to the rear pivot connection on the axle housing so that the supporting effect of the suspension device is distributed evenly to both of the wheels.

5. In a heavy duty suspension for an off-road vehicle, the combination comprising a chassis, an axle assembly below the chassis, the axle assembly including a transversely extending axle housing having wheels at the lateral ends thereof and a forwardly extending tongue rigid with the axle housing and generally centered thereon, the forward end of said tongue having a front ball and socket connection with the chassis, the rear of the axle assembly providing a rear ball and socket connection laterally centered on the axle housing, the ball and socket connections defining a fore-and-aft extending roll axis, a single damped spring suspension device vertically arranged adjacent the axle housing, the suspension device engaging the rear ball and socket connection at its lower end and supportingly coupled to the chassis at its upper end, a rigid bracket extending downwardly from the chassis adjacent one end of the axle housing, a horizontal transversely extending link at the rear of the axle housing having first and second pivot points, the first pivot point being pinned to the lower end of the bracket and the second pivot point being pinned directly to the axle housing adjacent the opposite end of the latter so that the axle assembly is restrained by the link from moving laterally with respect to the chassis while accommodating relative rolling movement of the axle assembly about the roll axis as the vehicle passes over irregular ground contours, and means including an auxiliary biasing spring connected between the chassis and the axle assembly at a point eccentric to the roll axis for relatively biasing the axle assembly toward a centered position parallel to the chassis.

6. The combination as claimed in claim 2 including auxiliary biasing spring means connected between the chassis and the axle assembly at a point eccentric to the roll axis for relatively biasing the axle assembly toward a centered position parallel to the chassis together with means for damping motion of the biasing spring means.

7. The combination as claimed in claim 4 including auxiliary biasing spring means connected between the chassis and the axle assembly at a point eccentric to the roll axis for relatively biasing the axle assembly toward a centered position parallel to the chassis together with means for damping motion of the biasing spring means.

8. In a heavy duty suspension for an off-road vehicle, the combination comprising a chassis, an axle assembly below the chassis, the axle assembly including a transversely extending axle housing having wheels at the lateral ends thereof and a forwardly extending tongue rigid with the axle housing and generally centered thereon, the forward end of said tongue having a front pivot connection with the chassis, the rear end of the axle assembly providing a rear pivot connection laterally centered on the axle housing, the front and rear pivot connections being of the ball and socket type defining a fore-and-aft extending roll axis, a rigid bracket extending downwardly from the chassis to a point adjacent the axle housing and substantially offset in the lateral direction from the roll axis, a horizontal transversely extending lever having a first pivot point at one end, a second pivot point in the central portion thereof and a third pivot point at the opposite end, the first pivot point being connected to the lower end of the bracket and the second pivot point being connected to the rear pivot connection on the axle housing so that the axle assembly is restrained for moving laterally with respect to the chassis while accommodating rolling movement of the axle assembly about the roll axis as the vehicle passes over irregular ground contours, a single damped spring suspension device having an upper end and a lower end, the upper end being connected to the chassis and the lower end being connected to the third pivot point on the lever, the lever serving to transmit the supportive effect of the suspension device to the rear pivot connection on the axle housing so that the cushioning effect of the suspension device is distributed evenly to both of the wheels, an auxiliary biasing spring connected between the chassis and the axle assembly at a point eccentric to the roller axis for relatively biasing the axle assembly toward a centered position parallel to the chassis and a damping device arranged effectively in parallel with the auxiliary biasing spring for damping relative movement of the axle assembly and chassis about the roll axis, the lever being located adjacent the lower portion of the rear axle housing so that a large portion of the length of the spring suspension device is accommodated below the top of the rear axle housing thereby enabling reduction of clearance between the chassis and rear axle housing to provide a low vehicle center of gravity.

9. In a heavy duty suspension for an off-road vehicle, the combination comprising a chassis, an axle assembly below the chassis, the axle assembly including a transversely extending axle housing having wheels at the lateral ends thereof and a forwardly extending tongue rigid with the axle housing and generally centered thereon, the forward end of said tongue having a front pivot connection with the chassis, the rear portion of the axle assembly providing a rear pivot connection laterally centered on the axle housing, the front and rear pivot connections being of the ball and socket type defining a fore-and-aft extending roll axis, a rigid bracket extending downwardly from the chassis to a point adjacent the axle housing and substantially offset in the lateral direction from the roll axis, a horizontal transversely extending link having at least first and second spaced pivot points, the first pivot point being pinned to the lower end of the bracket and the second pivot point being pinned to the axle housing so that the axle assembly is restrained by the link from moving laterally with respect to the chassis while accommodating rolling movement of the axle assembly about the roll axis as the vehicle passes over irregular ground contours, and a single damped spring suspension device vertically adjacent the axle housing, the suspension device being connected at its upper end to the chassis and supportingly coupled at its lower end to the axle assembly at the roll axis so that the supportive effect of the suspension device is distributed evenly to both of the wheels, and means including a damping connection between the chassis and the axle assembly at a point eccentric to the roll axis for damping movement of the chassis about the roll axis.

10. In a heavy duty suspension for an off-road vehicle, the combination comprising a chassis, an axle assembly below the chassis, the axle assembly including a transversely extending axle housing having wheels at the lateral ends thereof and a forwardly extending tongue rigid with the axle housing and generally centered thereon, the forward end of said tongue having a front ball and socket connection with the chassis, the rear of the axle assembly providing a rear ball and socket connection laterally centered on the axle housing, the ball and socket connections defining a fore-and-aft extending roll axis, a single damped spring suspension device vertically arranged adjacent the axle housing, the suspension device engaging the rear ball and socket connection at its lower end and supportingly coupled to the chassis at its upper end, a rigid bracket extending downwardly from the chassis adjacent one end of the axle housing a horizontal transversely extending link at the rear of the axle housing having first and second pivot points, the first pivot point being pinned to the lower end of the bracket and the second pivot point being pinned directly to the axle housing adjacent the opposite end of the latter so that the axle assembly is restrained by the link from moving laterally with respect to the chassis while accommodating relative rolling movement of the axle assembly about the roll axis as the vehicle passes over irregular ground contours, and means including a damping connection between the chassis and the axle assembly at a point eccentric to the roll axis for damping movement of the chassis about the roll axis.

* * * * *